United States Patent [19]

Dhyanchand et al.

[11] Patent Number: 4,937,725
[45] Date of Patent: Jun. 26, 1990

[54] CIRCUIT FOR ELIMINATING SNUBBER CURRENT NOISE IN THE SENSE CIRCUIT OF AN H-BRIDGE INVERTER

[75] Inventors: John J. Dhyanchand, Rockford; Rasappa Palaniappan, Dekalb, both of Ill.

[73] Assignee: Sundstrand Corporation, Rockford, Ill.

[21] Appl. No.: 367,689

[22] Filed: Jun. 19, 1989

[51] Int. Cl.⁵ .................................. H02M 7/537
[52] U.S. Cl. .......................... 363/56; 363/98; 363/132
[58] Field of Search ............ 363/17, 97, 98, 132, 363/133, 56, 57, 58

[56] References Cited

U.S. PATENT DOCUMENTS

| 4,466,041 | 8/1984 | Witulski et al. | 361/93 |
| 4,542,440 | 9/1985 | Chetty et al. | 363/41 |
| 4,555,754 | 11/1985 | Hennevin | 363/132 |
| 4,566,059 | 1/1986 | Gallios et al. | 363/17 |
| 4,607,322 | 8/1986 | Henderson | 363/56 |
| 4,626,980 | 12/1986 | McGuire | 363/132 |
| 4,688,165 | 8/1987 | Pruitt | 363/132 |
| 4,691,270 | 9/1987 | Pruitt | 363/132 |

Primary Examiner—Peter S. Wong
Attorney, Agent, or Firm—Antonelli, Terry, Stout & Kraus

[57] ABSTRACT

An H-bridge converter connected to a load includes a direct current power source, first and second pairs of switches alternately switched in order to connect the power source to the load, a plurality of snubber circuits correspondingly connected to the switches for protecting the switches from high currents and voltages, a sensing circuit connected between the first and second pairs of switches for sensing when each of the first and second pairs of switches are closed, and a snubber circuit counteracting circuit connected to a first snubber circuit of the first pair of switches, a second snubber circuit of the second pair of switches and to the sensing circuit for counteracting the flow of snubber currents in the sensing circuit from the first and second snubber circuits.

11 Claims, 3 Drawing Sheets

CIRCUIT FOR ELIMINATING SNUBBER CURRENT NOISE IN THE SENSE CIRCUIT OF AN H-BRIDGE INVERTER

TECHNICAL FIELD

The present invention relates to an H-bridge inverter having snubber circuits connected in parallel to switches of the inverter wherein the H-bridge inverter inverts a direct current to an alternating current. More particularly, the present invention relates to circuitry for eliminating noise in the sensing circuit of an H-bridge inverter caused by snubber currents flowing in the snubber and sensing circuits.

BACKGROUND ART

Inverters including H-bridge inverters are normally used in applications which require the inversion of direct current to alternating current. Such applications exist when direct current (DC) is readily available to a system but some devices in the system or the system itself operate only on alternating current (AC). Other applications exist where inverters are used to invert a DC voltage to an ac voltage which is then applied to a transformer which steps-up or steps-down the AC voltage for later use. Inverters may be used in modern aircraft to generate alternating current to provide power to radar systems, radio transmitters/receivers and the like, and a low voltage DC is used to charge the battery supply and to power other devices requiring low voltage DC.

In modern aircraft various types of systems can be used to generate power. One example of a conventional power generating system is shown in FIG. 1. In the conventional power generating system 10 of FIG. 1 an integrated drive generator (IDG) 12 is coupled to the drive shaft of the engine of an aircraft. The IDG includes a constant speed transmission which converts varying drive shaft speed into a constant shaft speed. The constant speed transmission is commonly known and can be of the type manufactured by the assignee of the present application.

The IDG also includes an alternator which converts the constant shaft speed produced by the constant speed transmission into 3 phase 400 Hz AC power which is applied to a 3 phase fullwave rectifier 14. The rectifier 14 rectifies the 3 phase, 400 Hz, AC power into a DC voltage which is applied to an H-bridge inverter 16.

The H-bridge inverter 16 inverts the DC voltage from the rectifier 14 into an alternating current which is applied to a transformer 18. The transformer 18 steps-down the AC voltage for rectification by a rectifier 20 which produces 28 volts DC for use by other devices of the aircraft and to charge the airframe battery supply 22.

Conventional H-bridge inverters of the type used in the conventional power generator of FIG. 1 are constructed in the form of the letter "H", as shown in FIG. 2. The conventional H-bridge inverter shown in FIG. 2 includes switches 100, 102, 104 and 106 at each of the legs of the letter "H" and a load 108 connected at the bridge of the letter "H". A DC power source 110 is applied across the legs of the H-bridge inverter such that when the switches are alternately switched, the DC voltage from the DC power source is alternately connected in opposite directions to the load 108. The load is the primary winding of the transformer 18 of FIG. 1. A sensing circuit 112 is provided in the H-bridge inverter to sense the closure of the switches. Sensing of the closure of the switches is performed so that the times at which the switches are closed can be controlled in order to optimize the quality of the AC voltage produced by the H-bridge inverter. The sensing circuit is of the magnetic sensing type which includes a transformer having a first winding 114 connected to a first pair of switches, a second winding 116 connected to a second pair of switches and a third winding 118 connected to a current sensing device 120.

In order to protect the switches of the H-bridge inverter from high currents and voltages during the switching operations, snubber circuits 122, 124, 126 and 128 are respectively connected to the switches.

A snubber circuit, as known, is a suppression network which includes a series connected capacitor and diode. The snubber circuit is connected in parallel to a switch. As indicated above, the snubber circuit protects the switch from high currents and voltages being applied to the switch during switching operations.

In addition, freewheeling diodes 130, 132, 134 and 136 are also connected in parallel with the switches to permit the flow of lagging currents across the switches when the switches are opened.

The conventional H-bridge inverter shown in FIG. 2 operates as follows. At one instant in time a first pair of switches 100 and 106 are closed to complete a circuit through the load 108 and the DC power source 110 thereby providing current through the load 108 in one direction. At another instant in time a second pair of switches 102 and 104 are closed to provide current through the load 108 in the opposite direction. The switches open and close in response to signals from a switch control circuit (not shown) which may operate according to a pulse width modulation technique. By carefully controlling the closures of the pairs of switches an AC waveform can be produced under control of the switch control circuit according to a pulse-width modulation technique through the load 108.

The sensing circuit 112 senses the times of closure of the switches. Current flowing in the first winding 114 of the sensing circuit 112 when the first pair of switches 100 and 106 are closed induces a current on the third winding 118 which is sensed by the current sensing device 120. Current flowing in the second winding 116 of the sensing circuit 112 when the second pair of switches 102 and 104 are closed induces a current on the third winding 118 which is sensed by the current sensing device 120. A signal indicating the switch closure times is provided by the sensing circuit 112 to the switch control circuit (not shown). The switch control circuit makes use of the signals output by the sensing circuit 112 to determine the times at which the switches are to be closed in order to optimize the operation of the H-bridge inverter.

Thus, as indicated above, the operation of the conventional H-bridge inverter can be optimized by carefully controlling the switch closure times of the switches.

In the conventional H-bridge inverter described above, one major disadvantage occurs. Snubber currents flowing in the snubber circuits 126 and 128 in the lower two legs of the H-bridge inverter parallely connected to switches 104 and 106 also flow into the sensing circuit 112 through lines 138 and 139. These snubber currents effect the operation of the sensing circuit 112 such that the times of switch closure of the pairs of switches is inaccurately sensed. Essentially the flow of snubber currents cause noise in the form of ringing to exist in the sensing circuit 112. The noise is a consequence of ringing in the snubber circuits 126 and 128. For example, when switch 106 opens energy stored in inductor L4 flows to capacitor C4 charging it with the polarity as indicated. Current then flows from the positive side of the capacitor through the power supply 110 and through the winding N1 to the negative side of the capacitor. The current through the winding N1 can interfere with the operation of the sense circuit to properly sense the main current flowing through the legs of the inverter. Ringing of a similar nature is also encountered with the opening of switch 104.

Although various circuits have been proposed for suppressing snubber currents, none have specifically addressed the problem of suppressing noise in the sensing circuit of an H-bridge inverter caused by the flow of snubber currents into the sensing circuit from snubber circuits connected to the switches of an H-bridge inverter.

For example, U.S. Pat. No. 4,542,440 discloses apparatus for switch current sensing in a push-pull converter having circuitry for suppressing snubber currents. As can be seen in the circuitry disclosed by U.S. Pat. No. 4,542,440, the snubber current suppression circuit disclosed therein does not address the problem of noise in the sensing circuit of an H-bridge inverter caused by snubber currents from the snubber circuits.

DISCLOSURE OF THE INVENTION

The present invention provides circuitry for eliminating noise caused by snubber currents flowing into a sensing circuit of an H-bridge inverter. The present invention improves the performance of the sensing circuit such that switch closures of each of the pairs of switches of the H-bridge converter are accurately sensed thereby optimizing the operation of the H-bridge inverter.

The present invention may be used in diverse environments such as an H-bridge inverter used on modern aircraft to provide an alternating current which is stepped-down and rectified to charge a battery.

The H-bridge inverter of the present invention is connected to a load and includes a direct current (DC) power source, first and second pairs of switches alternately switched in order to connect the power source to the load, a plurality of snubber circuits correspondingly connected to the switches for protecting the switches from high currents and voltages and a sensing circuit connected between the first and second pairs of switches for sensing when each of the first and second pairs of switches are closed.

The present invention also includes a snubber current counteracting circuit coupled to a first snubber circuit of the first pair of switches, a second snubber circuit of the second pair of switches and to the sensing circuit. The snubber current counteracting circuit counteracts the flow of snubber currents in the sensing circuit originating from the first and second snubber circuits.

The snubber currents flowing in the sensing circuit cause inaccurate sensing of the switching times of the first and second pairs of switches.

BEST MODE FOR CARRYING OUT THE INVENTION

Figure 1:
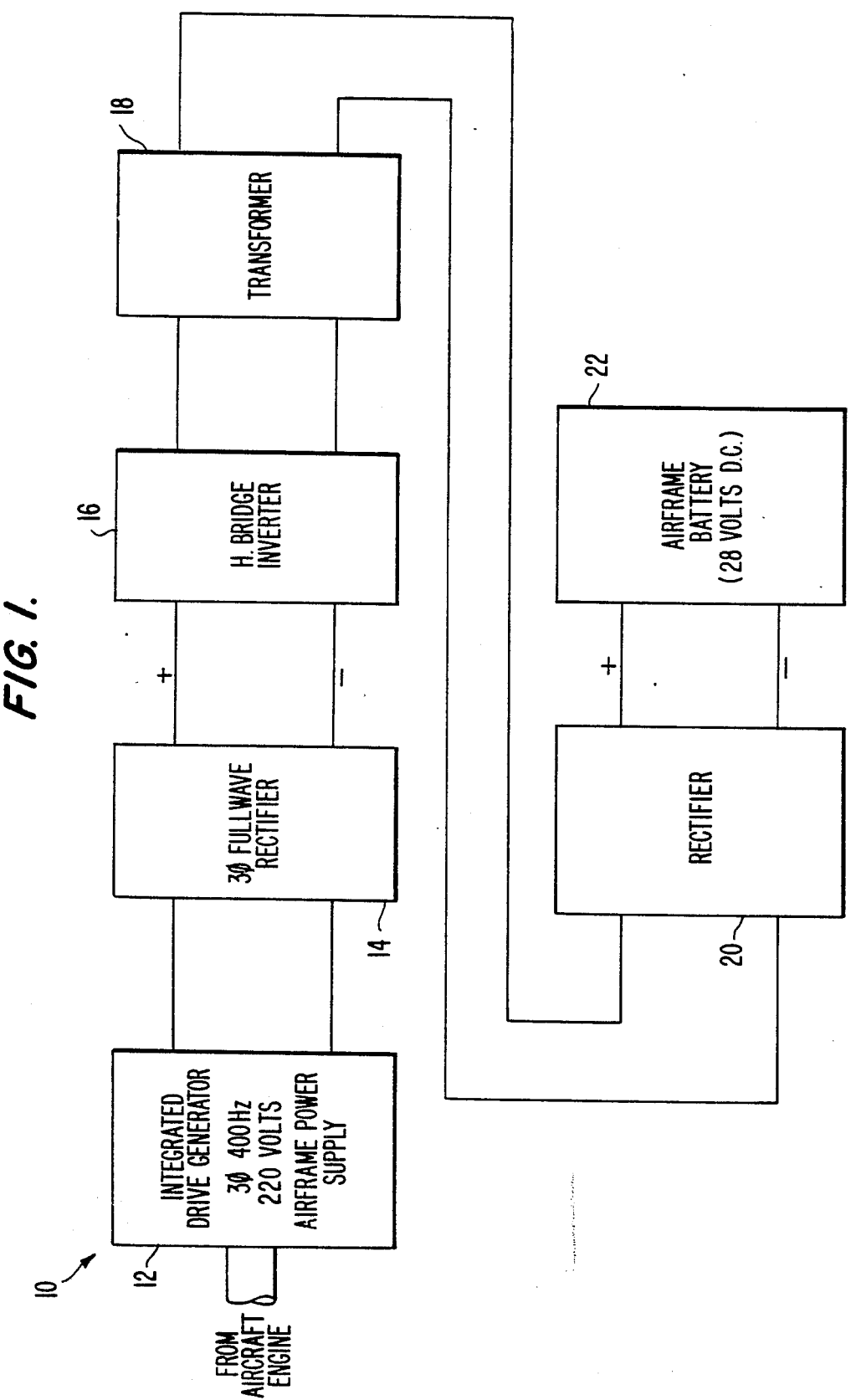
FIG. 1 illustrates a conventional power generating system of an aircraft.

FIG. 1 illustrates a specific application of an H-bridge inverter in the power generating system of an aircraft. H-bridge inverters can be applied to any system which requires the use of an inverter, particularly an H-bridge inverter having snubber circuits. Moreover, an H-bridge inverter may be used to generate AC by applying a pulse width modulation technique to the switches of the inverter and filtering the resultant pulsating AC.

Figure 2:
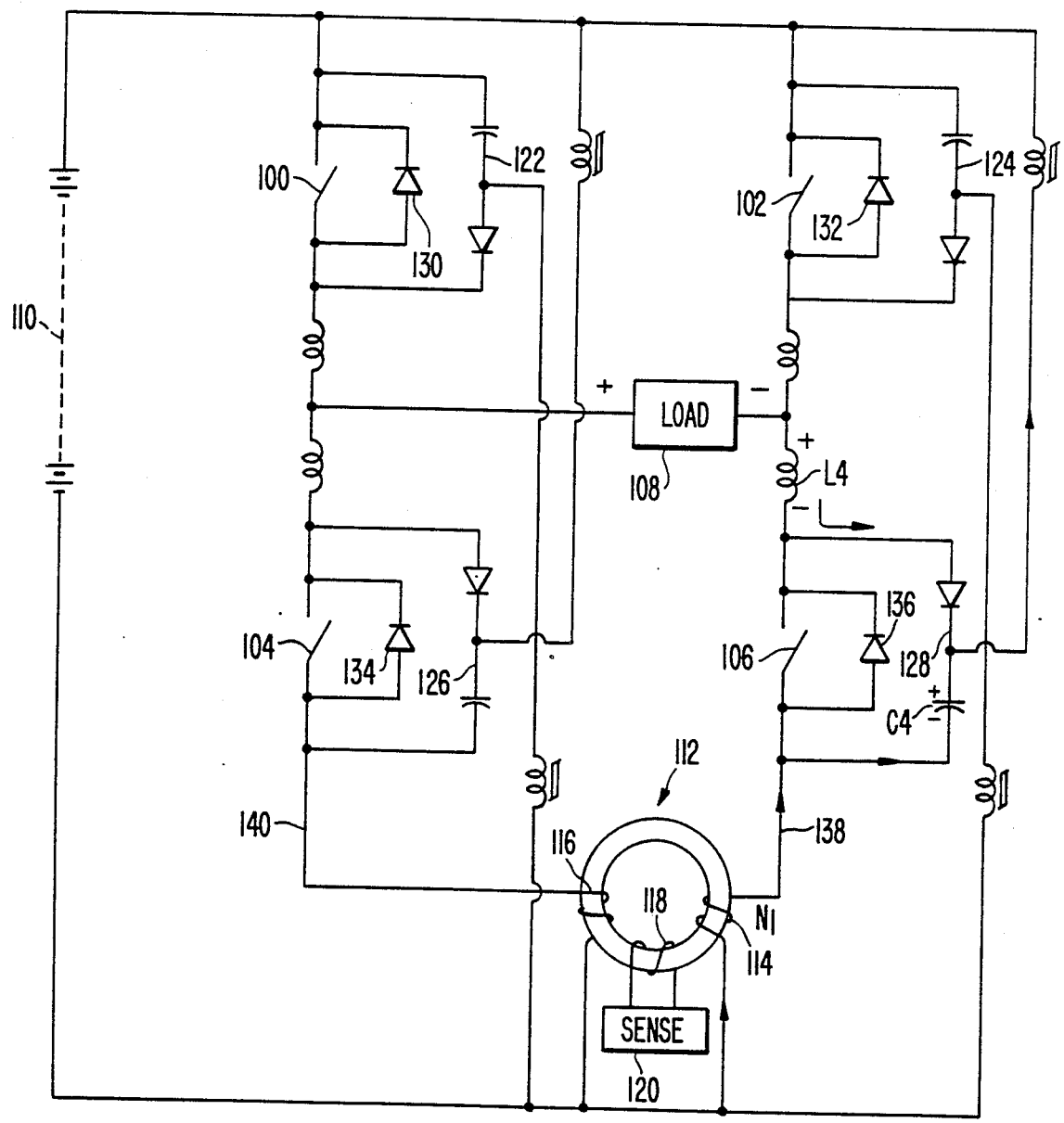
FIG. 2 illustrates a conventional H-bridge inverter circuit.
Figure 3:
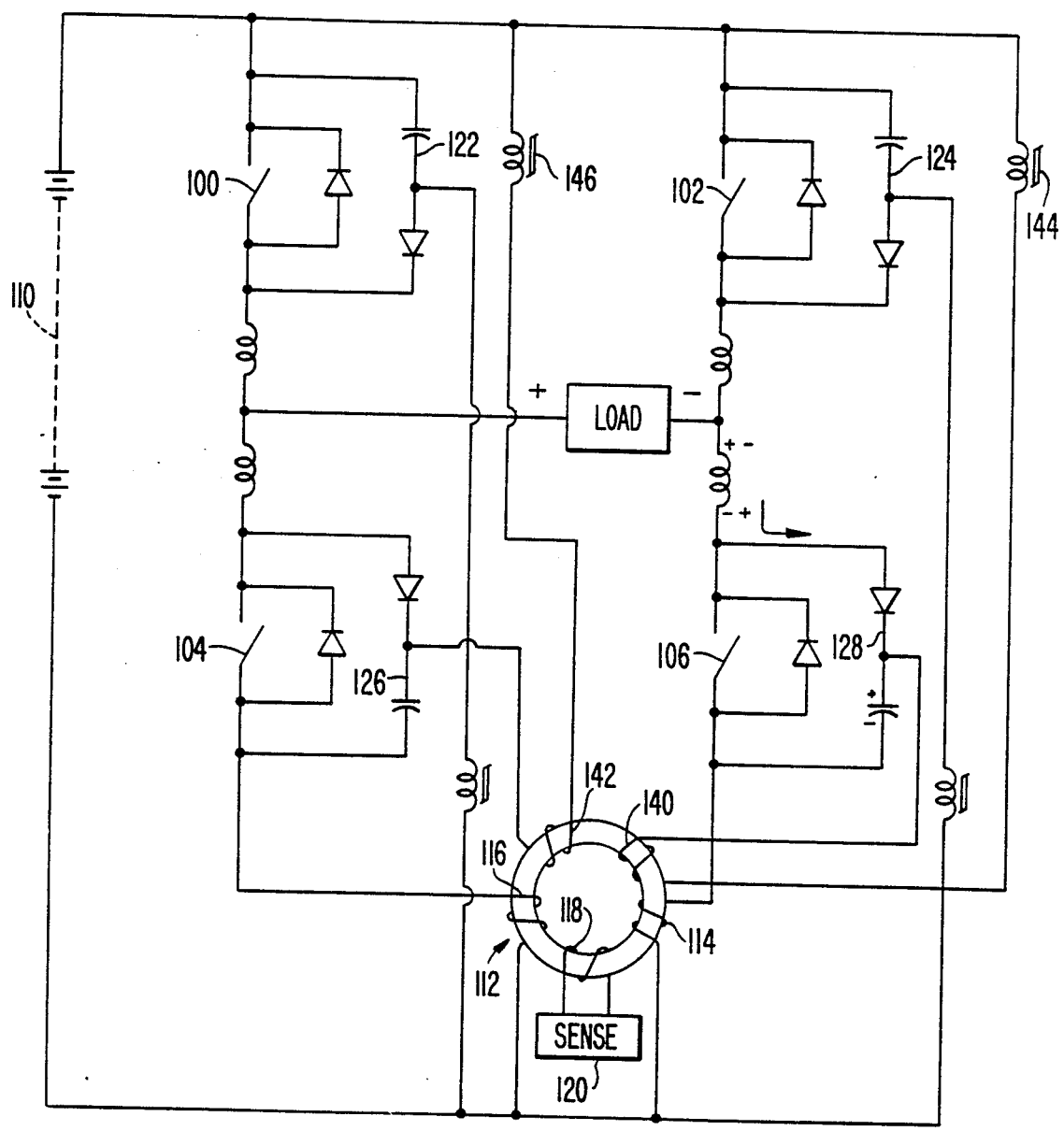
FIG. 3 illustrates an H-bridge inverter circuit of the present invention.

An H-bridge inverter to which the present invention is applied is shown in FIG. 3. Like reference numerals identify like parts in FIGS. 2 and 3. The apparatus of the present invention eliminates the undesired effects caused by the snubber currents by providing a snubber current counteracting circuit having an arrangement as described below. The H-bridge inverter circuit shown in FIG. 3 includes two pairs of switches, namely a first pair of switches 100 and 106, and a second pair of switches 102 and 104. Each of the pairs of switches operates (open and close) as a unit in response to a signal from a switch control circuit (not shown) which may operate in accordance with a pulse width modulation technique.

The H-bridge inverter of the present invention as shown in FIG. 3 includes a DC power source 110 which is connected across the legs of the H-bridge inverter. Connected in parallel with the switches 100, 102, 104 and 106 are freewheeling diodes 130, 132, 134 and 136 respectively. Also respectively connected in parallel with the switches 100, 102, 104 and 106 are snubber circuits 122, 124, 126 and 128. A load 108 is connected in the bridge of the H-bridge converter.

A sensing circuit 112 is connected between switch 106 and switch 104 of the first and second pairs of switches respectively. The sensing circuit 112 is of the current sensing transformer type where current from one of the pairs of switches, for example switches 100 and 106, is applied to a first winding 114 of the transformer, and current from the second pair of switches 102 and 104, is applied to a second winding 116 of the transformer. A current sensing device 120 is connected to a third winding 118 of the transformer.

The sensing circuit 112 operates as follows. When the first pair of switches 100 and 106 are closed and the second pair of switches 102 and 104 are open current flows from the power source 110 through switch 100, load 108 and switch 106 to the sensing circuit 112 through the first winding 114. Current flowing through the first winding 114 creates a flux which induces a current in the third winding 118 which is connected to current sensing device 120. Current sensing device 120 senses the induced current and indicates that the first pair of switches 100 and 106 have been closed.

In the opposite direction, when the first pair of switches 100 and 106 are open and the second pair of switches 102 and 104 are closed, current flows from the power source 110 through switch 102, load 108 and switch 104 to the sensing circuit 112 through the second winding 116. Current flowing through the second winding 116 creates a flux which induces a current in the third winding 118 to which current sensing device 120 is connected. The current sensing device 120 senses the induced current in the third winding 118 and indicates that the second pair of switches 102 and 104 are closed.

During the operation of the conventional H-bridge inverter snubber currents are caused to flow in the bottom two snubber circuits 104 and 106 of the H-bridge inverter. These snubber currents flow from the snubber circuits through the first and second windings 114 and 116 respectively of the sensing circuit 112, causing undesired electrical ringing in the third winding 118 of the sensing circuit 112, as described above with reference to the prior art. The electrical noise produced by the snubber currents in the third winding 118 causes an inaccurate sensing of the induced current in the third winding 118 by the current sensing device 120 thereby causing the current sensing device 120 to provide an inaccurate indication of switch closures of both the first and second pairs of switches.

As indicated above, the sensing of the closures of the first and second pairs of switches is performed in order to optimize the operation of the H-bridge inverter by accurately controlling the times at which the first and second pairs of switches are alternately closed.

The elements of the H-bridge inverter of the present invention are generally the same as the conventional H-bridge inverter shown in FIG. 2 excepting the provision of a snubber current counteracting circuit having fourth and fifth windings 140 and 142 being provided on the transformer of the sensing circuit 112. The fourth winding 140 is connected to the snubber circuit 128 between the diode and capacitor of the snubber circuit and to a choke 144 which is connected to the DC power source 110. The fifth winding 142 is connected to the snubber circuit 126 between the diode and capacitor of the snubber circuit and to a choke 146 which is connected to the DC power source 110.

Snubber currents, which flow in the conventional H-bridge inverter through the snubber circuits 126 and 128 and into the first and second windings 114 and 116 respectively of the sensing circuit 112 now, in accordance with the present invention, flow from the snubber circuit 128 to fourth winding 140 and from the snubber circuit 126 to the fifth winding 142. The fourth and fifth windings 140 and 142 are wound on the transformer of the sensing circuit 112 in a direction opposite to that of the first and second windings 114 and 116. Thus, flux generated by the fourth winding 140 as a result of snubber currents flowing therein, cancels the flux generated by the first winding 114 due to the equivalent snubber currents flowing therein. Similarly, flux generated by the fifth winding 142, as a result of the snubber currents flowing therein, cancels the flux generated by the second winding 116 due to the equivalent snubber currents flowing therein. Therefore, current (electrical ringing) related to the snubber currents, is not induced in the third winding 118.

As can be seen, the snubber current counteracting circuit counteracts snubber currents in the sensing circuit thereby permitting accurate sensing of switch closures by the sensing circuit.

While the invention has been described in terms of its preferred embodiment, it should be understood that numerous modifications may be made thereto without departing from the spirit and scope of the present invention. It is intended that all such modifications fall within the scope of the appended claims.

We claim:

1. An H-bridge inverter connected to a load comprising:
    a direct current power source;
    first and second pairs of switches which are alternately switched to connect said power source to said load;
    a plurality of snubber circuits wherein each snubber circuit is connected in parallel to a switch of said first and second pairs of switches for protecting said switch from high currents and voltages;
    a sensing circuit connected between said first and second pairs of switches for sensing when said first and second pairs of switches are closed; and
    a snubber current counteracting circuit coupled to a first snubber circuit connected in parallel to a first switch of said first pair of switches, a second snubber circuit connected in parallel to a second switch of said second pair of switches and to said sensing circuit; and
    wherein said snubber current counteracting circuit counteracts snubber currents flowing in said sensing circuit caused by said first and second snubber circuits.

2. An H-bridge inverter according to claim 1, wherein:
    each snubber circuit includes a capacitor connected in series to a diode.

3. An H-bridge inverter according to claim 2, further comprising:
    freewheeling circuits correspondingly connected in parallel to said switches for permitting lagging currents to flow across said switches.

4. An H-bridge inverter according to claim 3, wherein each freewheeling circuit includes a diode.

5. An H-bridge inverter according to claim 1 wherein said sensing circuit includes:
    a transformer having a first winding connected in series between said first pair of switches and said power source;
    a second winding connected in series between said second pair of switches and said power source; and
    a third winding connected to a current sensing device; and
    wherein current flowing through either of said first and second windings creates a flux which induces a current in said third winding which is sensed by said current sensing device, said current sensing device indicates times of closure of said first and second pair of switches.

6. An H-bridge inverter according to claim 5, wherein said snubber current counteracting circuit includes:
    a fourth winding wound on said transformer in a direction opposite to that of said first and second windings, said fourth winding being coupled in series between said first snubber circuit and said power source; and
    a fifth winding wound on said transformer in a direction opposite to that of said first and second windings, said fifth winding being connected in series between said second snubber circuit and said power source; and
    wherein snubber currents flowing in said fourth and fifth windings create flux which cancels flux created by said first and second windings due to snubber currents flowing therein, thereby eliminating noise caused by snubber currents in said third winding.

7. An H-bridge inverter according to claim 6, wherein:

said H-bridge inverter is included in a power generating system of an aircraft.

8. An H-bridge inverter connected to a load including a direct current current power source, first and second pairs of switches being alternately switched to connect said power source to said load, a plurality of snubber circuits wherein each snubber circuit is connected in parallel to a switch of said first and second pairs of switches for protecting said switch from high currents and voltages, a sensing circuit connected between said first and second pairs of switches for sensing when said first and second pairs of switches are closed, wherein the improvement comprises;
   a snubber current counteracting circuit coupled to a first snubber circuit connected in parallel to a first switch of said first pair of switches, a second snubber connected in parallel to a second switch of said second pair of switches and to said sensing circuit; and
   wherein said snubber current counteracting circuit counteracts snubber currents flowing in said sensing circuit caused by said first and second snubber circuits.

9. An H-bridge inverter according to claim 8, wherein said sensing circuit includes:
   a transformer having a first winding connected in series between said first pair of switches and said power source, a second winding connected in series between said second pair of switches and said power source and a third winding connected to a current sensing device; and
   wherein current flowing through either of said first and second windings creates a flux which induces a current in said third winding which is sensed by said current sensing device, said current sensing device indicates times of closure of said first and second pairs of switches.

10. An H-bridge inverter according to claim 9, wherein said snubber current counteracting circuit includes:
   a fourth winding wound on said transformer in a direction opposite to that of said first and second windings, said fourth winding being connected in series between said first snubber circuit and said power source;
   a fifth winding wound on said transformer in a direction opposite to that of said first and second windings, said fifth winding being connected in series between said second snubber circuit and said power source; and
   wherein snubber currents flowing in said fourth and fifth windings create flux which cancels flux created by said first and second windings due to snubber currents flowing therein, thereby eliminating noise caused by snubber currents in said third winding.

11. An H-bridge inverter according to claim 10, wherein said H-bridge inverter is included in a power generating system of an aircraft.

* * * * *